United States Patent [19]

MacSaveny

[11] Patent Number: 5,443,336
[45] Date of Patent: Aug. 22, 1995

[54] DIE HANDLE OILING SYSTEM FOR USE WITH A CUTTING DIE HEAD

[76] Inventor: John P. MacSaveny, 2425 Prince St., Bellmore, N.Y. 11710

[21] Appl. No.: 276,793

[22] Filed: Jul. 18, 1994

[51] Int. Cl.$^6$ .............................................. B23G 5/00
[52] U.S. Cl. ...................................... 408/61; 470/207
[58] Field of Search ............... 408/56, 60, 61, 221, 408/238; 470/207

[56] References Cited

U.S. PATENT DOCUMENTS

| | | | |
|---|---|---|---|
| 1,231,591 | 7/1917 | Fritz et al. | 408/60 |
| 2,000,482 | 5/1935 | Hinkle | 408/60 |
| 2,136,121 | 11/1938 | Westfall | 408/60 |

Primary Examiner—Daniel W. Howell

[57] ABSTRACT

A die handle oiling system for use with a cutting die head comprising a tubular handle having a sealed base end, a sealed tip end adapted for holding a cutting die head thereon, an air cavity for holding air formed therein adjacent to the base end, a plunger cavity for holding oil formed therein adjacent to the tip end and in communication with the air cavity, an inlet valve extended from the air cavity for allowing air to be disposed therein, a pressure release valve extended from the air cavity for allowing air to be released therefrom, a sealable filling bore extended from the plunger cavity for allowing oil to be disposed therein, and an oil outlet extended from the plunger for allowing oil to be released therefrom; a plunger slidably disposed within the plunger cavity; an oil hose coupled to the oil outlet; and an actuatable air pump coupled to the inlet valve for filling the air cavity with air; whereby when the air pump is actuated, air pressure builds in the air cavity and forces the plunger towards the tip end of the handle for allowing oil to be released through the oil hose.

6 Claims, 4 Drawing Sheets

DIE HANDLE OILING SYSTEM FOR USE WITH A CUTTING DIE HEAD

BACKGROUND OF THE INVENTION

1. Field of the Invention

The present invention relates to a die handle oiling system for use with a cutting die head and more particularly pertains to torquing and simultaneously lubricating a cutting die head for cutting threads on pipes, rods, and the like with a die handle oiling system for use with a cutting die head.

2. Description of the Prior Art

The use of lubricating devices is known in the prior art. More specifically, lubricating devices heretofore devised and utilized for the purpose of lubricating a cutting mechanism when cutting threads are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,595,342 to O'-Leary discloses an oiler system and device. U.S. Pat. No. 3,664,556 discloses a hand pump oiler. U.S. Pat. No. 3,767,012 to Jimi et al. discloses an automatic o-ring arrangement of a die-casting machine. U.S. Pat. No. 3,782,501 to Pagella discloses a lubricating-oil control device for use in machines, for instance machine tools.

While these devices fulfill their respective, particular objective and requirements, the aforementioned patents do not describe a die handle oiling system for use with a cutting die head that is used to torque and simultaneously lubricate a cutting die head for cutting pipes, rods, and the like.

In this respect, the die handle oiling system for use with a cutting die head according to the present invention substantially departs from the conventional concepts and designs of the prior art, and in doing so provides an apparatus primarily developed for the purpose of torquing and simultaneously lubricating a cutting die head for cutting threads on pipes, rods, and the like.

Therefore, it can be appreciated that there exists a continuing need for new and improved die handle oiling system for use with a cutting die head which can be used for torquing and simultaneously lubricating a cutting die head for cutting threads on pipes, rods, and the like. In this regard, the present invention substantially fulfills this need.

SUMMARY OF THE INVENTION

In the view of the foregoing disadvantages inherent in the known types of lubricating devices now present in the prior art, the present invention provides an improved die handle oiling system for use with a cutting die head. As such, the general purpose of the present invention, which will be described subsequently in greater detail, is to provide a new and improved die handle oiling system for use with a cutting die head and method which has all the advantages of the prior art and none of the disadvantages.

To attain this, the present invention essentially comprises, in combination, a rigid, elongated, and tubular handle having a central axis, an interior and exterior surface, a sealed and outwardly bevelled base end, a sealed and outwardly threaded tip end for holding a cutting die head thereon with the tip end further having a threaded filling bore disposed therethrough aligned with the central axis, a lip extended radially inwards from the interior surface between the base and tip end to define an air cavity for holding air therein located adjacent to the base end and a plunger cavity for holding oil therein located adjacent to the tip end, an inlet ball valve extended between the exterior surface and air cavity for allowing air into the air cavity, a pressure release valve extended between the base end and air cavity with a depressible button extended therefrom for allowing air to be released from the air cavity when depressed, and a threaded oil outlet extended between the exterior surface and the plunger cavity for allowing oil disposed within the plunger cavity to exit therethrough. A plunger is included and slidably disposed within the plunger cavity. The plunger has a generally cylindrical head with a front end and a rear end and a plurality of seal rings disposed therearound in contact with the interior surface of the handle. The rear end of the head is positionable against the lip of the handle when the plunger cavity is completely filled with oil through the filling bore, and the front end of the head is positionable near the tip end of the handle when the plunger cavity is nearly devoid of oil. An elongated and flexible oil hose is included for allowing oil to be released from the plunger cavity with the oil hose having a base end threadably coupled within the oil outlet and a cone-shaped nozzle adapted to be positioned near a cutting die head for applying oil thereto for cutting. An oil hose holder is included and formed of two spaced, aligned, and rigid clamps coupled to the exterior surface of the handle for holding the oil hose in a stowed configuration. An elongated and rigid push-rod is included and has a handle end and a tip end with the tip end positionable through the filling bore for pushing the plunger back towards the base end of the handle, thereby allowing the plunger cavity to be refilled with oil. A push rod holder is included and formed of two spaced, aligned, and rigid clamps coupled to the exterior surface of the handle opposite the oil hose holder for holding the push rod in a stowed configuration. An oil plug is threadably coupled within the filling bore of the handle. An oil cap is included and securable over the nozzle of the oil hose for preventing oil leakage therefrom with the cap further having a tether extended therefrom and secured to a bracket of the oil hose holder for securing the cap in a proximal location for use. Lastly, an air pump is coupled to the handle directly below the inlet ball valve thereof with the air pump having a hollow housing with an open front end facing the tip end of the handle, a sealed rear end facing the base end of the handle, an air intake extended from the rear end, a trigger having a rear end slidably disposed within the front end of the housing and a front end extended therefrom, a rubber seal secured between the trigger and housing, a one-way check valve disposed within the air intake, and a spring disposed between the trigger and rear end of the housing. When the trigger is depressed, the one-way check valve is closed and air within the housing is forced through the ball valve and into the air cavity for building pressure therein, thus forcing the plunger towards the tip end of the handle for allowing oil to be released through the oil hose. When the trigger is released, the one-way check valve opens for allowing air into the housing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved die handle oiling system for use with a cutting die head which has all the advantages of the prior art lubricating devices and none of the disadvantages.

It is another object of the present invention to provide a new and improved die handle oiling system for use with a cutting die head which may be easily and efficiently manufactured and marketed.

It is a further object of the present invention to provide a new and improved die handle oiling system for use with a cutting die head which is of durable and reliable construction.

An even further object of the present invention is to provide a new and improved die handle oiling system for use with a cutting die head which is susceptible of a low cost of manufacture with regard to both materials and labor, and which accordingly is then susceptible of low prices of sale to the consuming public, thereby making such a die handle oiling system for use with a cutting die head economically available to the buying public.

Still yet another object of the present invention is to provide a new and improved die handle oiling system for use with a cutting die head which provides in the apparatuses and methods of the prior art some of the advantages thereof, while simultaneously overcoming some of the disadvantages normally associated therewith.

Even still another object of the present invention is to provide a new and improved die handle oiling system for use with a cutting die head for torquing and simultaneously lubricating a cutting die head for cutting threads on pipes, rods, and the like.

Lastly, it is an object of the present invention to provide a new and improved die handle oiling system for use with a cutting die head comprising a tubular handle having a sealed base end, a sealed tip end adapted for holding a cutting die head thereon, an air cavity for holding air formed therein adjacent to the base end, a plunger cavity for holding oil formed therein adjacent to the tip end and in communication with the air cavity, an inlet valve extended from the air cavity for allowing air to be disposed therein, a pressure release valve extended from the air cavity for allowing air to be released therefrom, a sealable filling bore extended from the plunger cavity for allowing oil to be disposed therein, and an oil outlet extended from the plunger for allowing oil to be released therefrom; a plunger slidably disposed within the plunger cavity; an oil hose coupled to the oil outlet; and an actuatable air pump coupled to the inlet valve for filling the air cavity with air, whereby when the air pump is actuated, air pressure builds in the air cavity and forces the plunger towards the tip end of the handle for allowing oil to be released through the oil hose.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
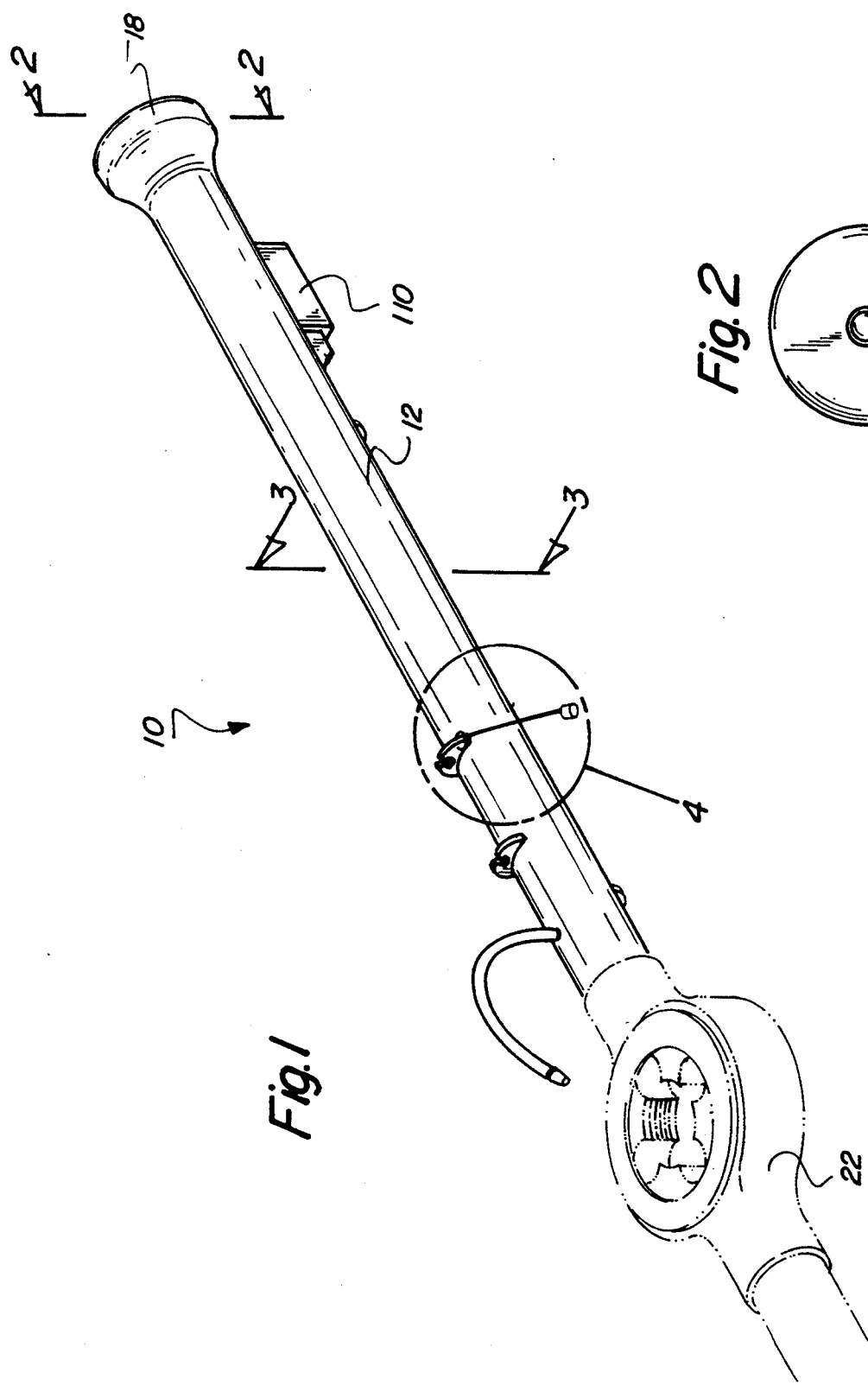
FIG. 1 is a perspective view of the preferred embodiment of the die handle oiling system for use with a cutting die head constructed in accordance with the principles of the present invention.
Figure 2:
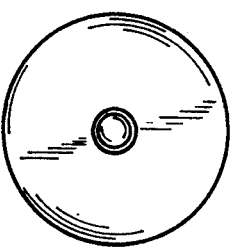
FIG. 2 is a side elevational view of the present invention depicting the pressure release valve on the base end of the handle taken along the line 2—2 of FIG. 1.
Figure 3:
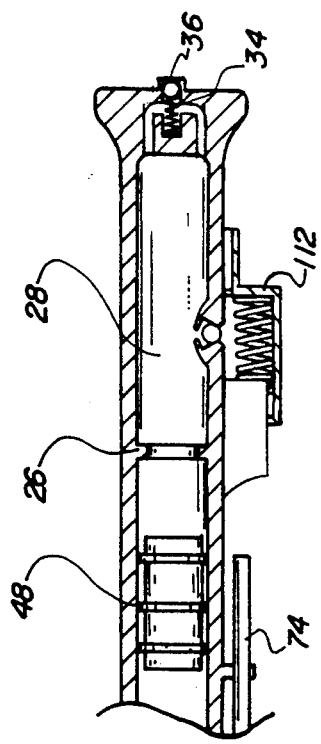
FIG. 3 is a cross,sectional view of the present invention taken along the line 3—3 of FIG. 1.
Figure 3:
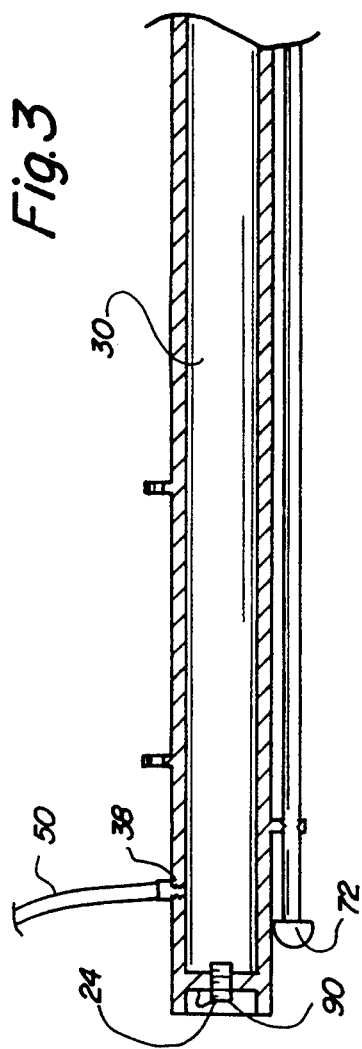
Figure 4:
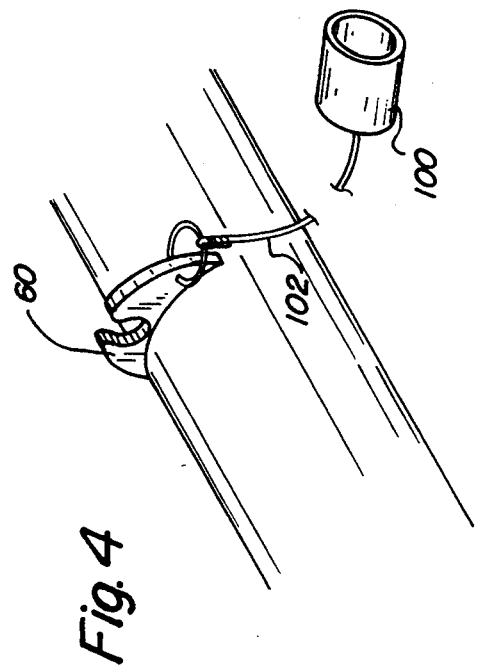
FIG. 4 is an enlarged view of a bracket of the oil hose holder and associated oil cap coupled thereto as shown in FIG. 1.
Figure 5:
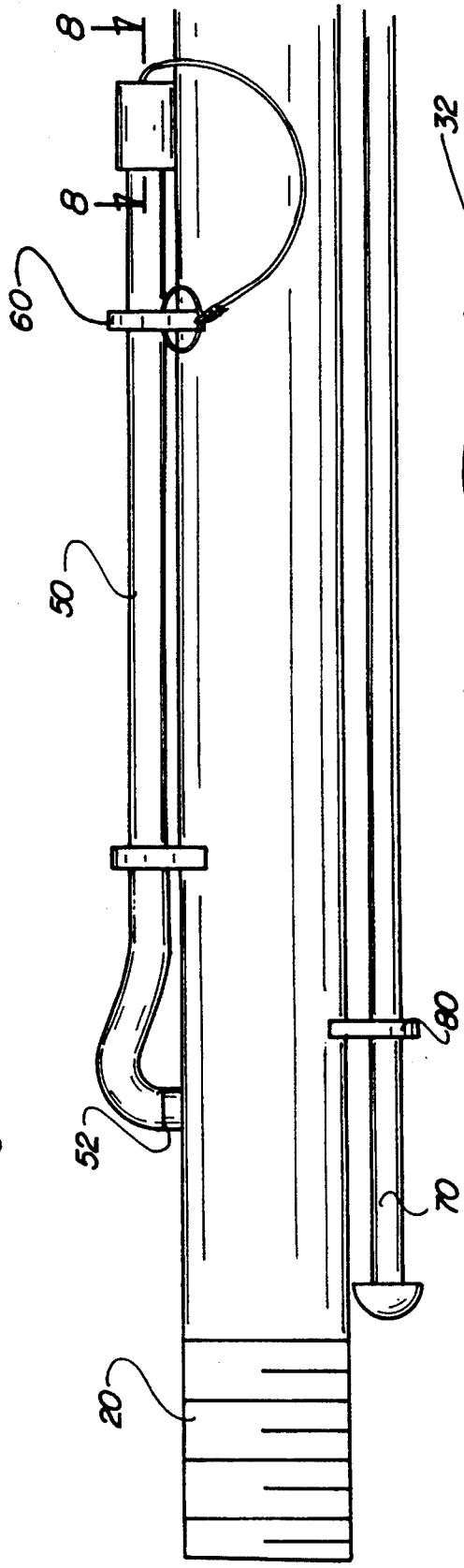
FIG. 5 is an enlarged view of the present invention depicting the oil hose and push rod in a stowed configuration.
Figure 6:
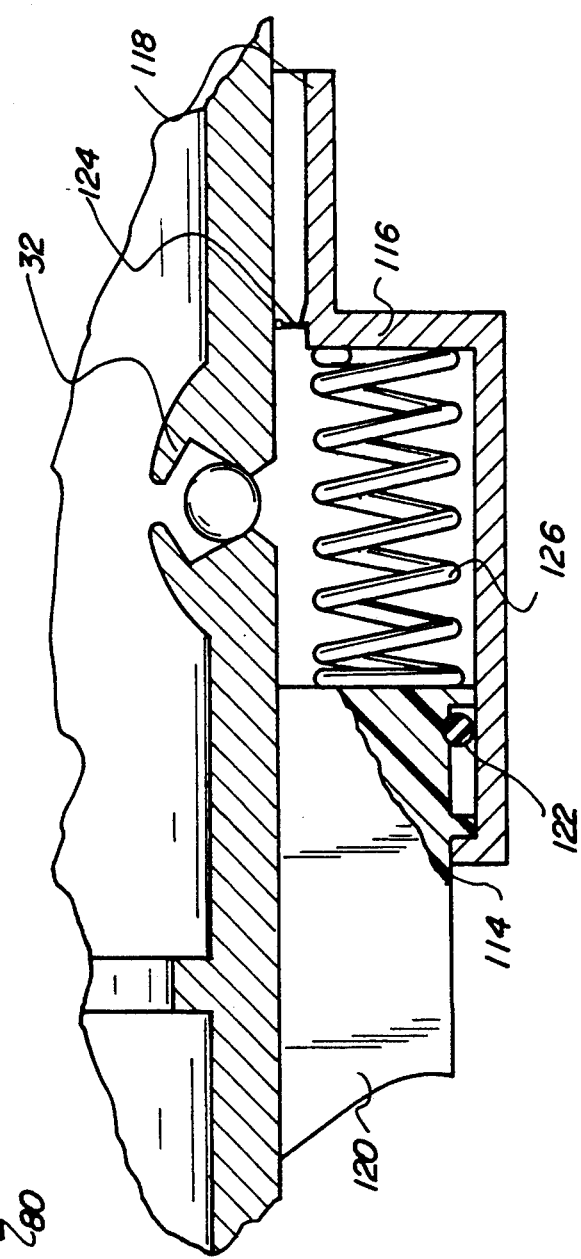
FIG. 6 is a cross-sectional view of the air pump and its relation with the air cavity of the handle.
Figure 8:
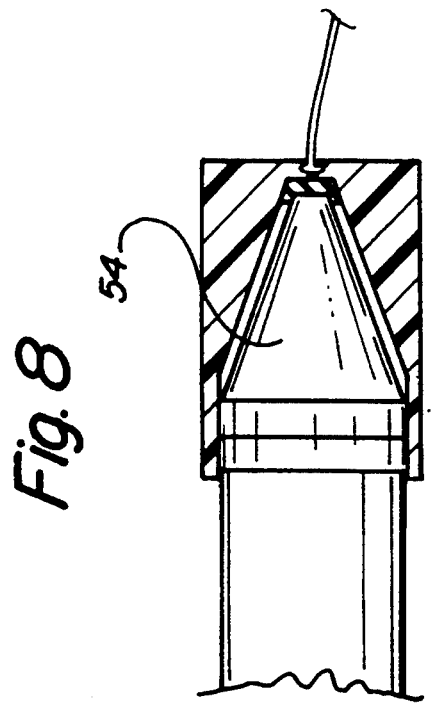
FIG. 8 is a cross-sectional view of the coupling between the oil cap and the nozzle of the oil hose.
Figure 7:
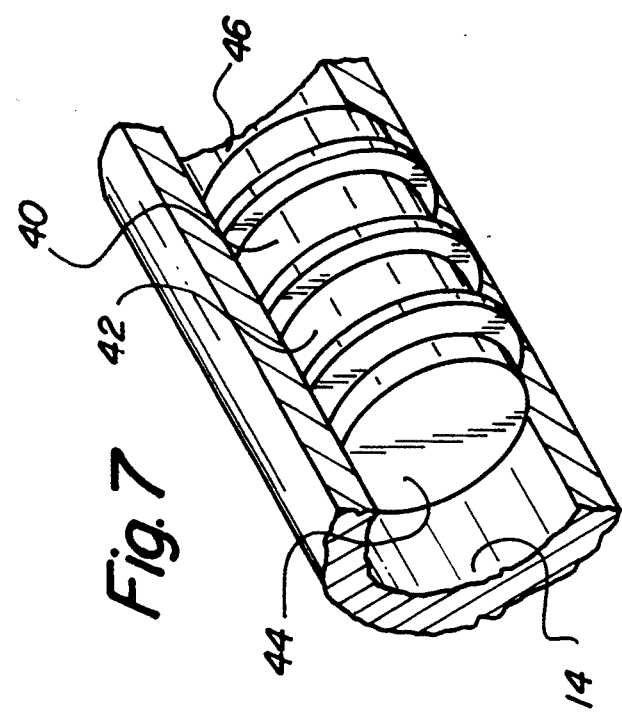
FIG. 7 is an enlarged cross-sectional view of the plunger slidably disposed in the plunger cavity of the handle.

With reference now to the drawings, and in particular, to FIG. 1 thereof, the preferred embodiment of the new and improved die handle oiling system for use with a cutting die head embodying the principles and concepts of the present invention and generally designated by the reference number 10 will be described.

Specifically, the present invention includes nine major components. The major components are handle, plunger, oil hose, oil hose holder, push-rod, push rod holder, oil plug, oil cap, and air pump. These components are interrelated to provide the intended function.

More specifically, it will be noted in the various Figures that the first major component is the handle 12. The handle is rigid, elongated, and tubular in structure. The handle has a central axis, an interior surface 14, and an exterior surface 16. The handle also has a sealed and upwardly beveled base end 18 and a sealed and outwardly threaded tip end 20. The tip end is adapted for holding a threaded cutting die head 22 thereon for cutting pipes, rods, and the like. The tip end further includes a threaded filling bore 24 disposed therethrough and aligned with the central axis. The filling bore is adapted to be coupleable with an external oil filling nozzle. The handle also includes a lip 26. The lip is extended radially inwards from the interior surface for a small distance between the base end and tip end to divide the hollow interior of the handle and thereby define an air cavity 28 for holding air therein located adjacent to the base end and a plunger cavity 30 for holding oil therein located adjacent to the tip end. The handle includes an inlet ball valve 32 extended between the exterior surface and the air cavity. The inlet ball valve is used for allowing air to enter the air cavity. A pressure release valve 34 is extended between the base end and the air cavity and aligned with the central axis of the handle. The pressure release valve has a depressible button 36 formed thereon and extended from the base end of the handle. This button allows air to be released from the air cavity when depressed. The handle also includes a threaded oil outlet 38 extended between the exterior surface the plunger cavity for allowing oil disposed within the plunger cavity to exit therethrough.

The second major component is the plunger 40. The plunger is slidably disposed within the plunger cavity 30. The plunger has a generally cylindrical and rigid head 42. The head has a front end 44 and a rear end 46. The plunger also includes a plurality of generally flexible seal rings 48 disposed around the head in contact with the interior surface 14 of the handle. The seal rings are used for ensuring that major amounts of oil do not leak around the plunger as it is moved towards the tip end of the handle. The rear end of the head is positionable against the lip 26 of the handle when the plunger cavity is completely filled with oil through the filling bore 24. The front end of the head is positionable near the tip end 20 of the handle when the plunger cavity is nearly devoid of oil.

The third major component is the oil hose 50. The oil hose is elongated and flexible in structure. It is formed of rubber or similar material. The oil hose is used for allowing oil to be released from the plunger cavity 30 and directed to a desired location. The oil hose has a base end 52 formed of metal threadably coupled with the oil outlet 38. The oil hose also has a cone-shaped nozzle 54 adapted to be positioned near a cutting die head 22 for applying oil for cutting.

The fourth major component is the oil hose holder 60. The oil hose holder is formed of two spaced, aligned, and rigid clamps. The clamps are coupled to the exterior surface 16 of the handle. The oil hose holder is used for holding the oil hose 50 in a stowed configuration against the handle such that it is aligned in parallel with the central axis of the handle.

The fifth major component is the push-rod 70. The push-rod is elongated and rigid in structure. It has a handle end 72 and a tip end 74. The tip end is positionable through the filling bore 24 for pushing the plunger 40 back towards the base end of the handle. This allows the plunger cavity 30 to be refilled with oil for use.

The sixth major component is the push-rod holder 80. The push-rod holder is formed of two spaced, aligned, and rigid clamps. The clamps are coupled to the exterior surface 16 of the handle at a location opposite the oil hose holder 60. The push-rod holder is used for holding the push-rod 70 in a stowed configuration against the handle and aligned in parallel with the central axis of the handle. At this location, the push-rod is readily accessed for use.

The seventh major component is the oil plug 90. The oil plug is rigid and threaded in structure. It is threadably coupled within the filling bore 24 of the handle. The oil plug is removable for receiving the push-rod for pushing the plunger back towards the base end of the handle and removable for refilling the plunging cavity with oil.

The eighth major component is the oil cap 100. The oil cap is generally rigid in structure. It is securable over the nozzle 54 of the oil hose. It is used for protecting the nozzle as well as preventing oil leakage from the oil hose. The cap further has a tether 102 extended therefrom and secured to a bracket of the oil hose holder 60 with a rigid ring. In this coupled configuration, the cap is placed in a proximal location for use.

The ninth major component is the air pump 110. The air pump is coupled to the handle 12 directly below the inlet ball valve 32. The air pump has a hollow and rigid housing 112. The housing has an open front end 114 facing the tip end 20 of the handle. The housing has a sealed rear end 116 facing the base end 18 of the handle. A side wall is peripherally extended around the front end and rear end and coupled to the handle to define a hollow interior. The housing includes an air intake 118 extended from the rear end. The air pump includes a trigger 120 having a rear end slidably disposed through the front end of the housing into the interior thereof and a front end extended from the housing for allowing actuation by a user. A rubber seal 122 is secured between the trigger and housing for preventing inadvertent leakage of air from between the trigger and the housing at the front ends thereof. The air pump also includes a pivotal one-way check valve 124 disposed within and across the air intake. A spring 126 is extended between the trigger and rear end of the housing. The spring is used for urging the trigger outwards from the front end of the housing. When the front of the trigger is depressed, the one way check valve is closed, and air within the housing is forced through the ball valve 32 and into the air cavity 28. Air pressure then builds up within the air cavity, thus forcing the plunger 40 in the plunger cavity towards the tip end 20 of the handle. As the plunger is forced towards the tip end of the handle, oil contained in the plunger cavity is forced within and released through the oil hose. When the trigger of the air pump is released, the one-way check valve opens for allowing external air to enter the housing. Thus, by sustained actuation of the trigger, continual or increasing pressure may be applied within the air cavity for controlling the flow of oil from the oil hose. Thus, a user may torque the handle of the present invention for cutting with the cutting die head as well as simultaneously apply lubrication through the use of the air pump during this cutting operation.

The present invention is a feature which should be added to all equipment for cutting threads on pipe, rods, and other parts. It applies cutting oil on the surfaces being cut, serving as a lubricator and a coolant to improve the quality of the work being performed. The oil also reduces the wear on the cutting dies, increasing the number of threads which can cut before sharpening by regrinding is required. Dies also have a longer overall useful life if lubricating oils are applied as the metal is being removed. If the equipment which cuts the threads does not have a pumping system to apply the oils while it is in operation, the operator usually does so by manual means, using an oil can or a brush, because the heat generated at the cutting edges is significantly reduced by the fluids.

The present invention introduces oil by means of the handle which holds the cutting dies. The dies are provided in sets, since a separate unit is required to cut each size thread. However, the dies are interchangeable and fit on the tip end of the handle as provided. The plunger cavity in the handle will contain the oil which is released on the die through an adjustable oil hose. The pressure on the oil is maintained by a plunger through air pressure generated by squeezing the trigger of the air pump. A filling bore is provided for refilling the cylinder, and a pressure relief valve is provided for releasing air pressure from the air cavity and associated portion of the plunger cavity. To minimize the weight of the system, the present invention may be made of aluminum or other suitable lightweight and rigid materials. The basic design can be adapted to all types, makes, and sizes of pipe thread cutting equipment.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A die handle oiling system for use with a cutting die head for torquing and simultaneously lubricating a cutting die head for cutting threads on pipes, rods, and the like comprising, in combination:

a rigid, elongated, and tubular handle having a central axis, an interior and exterior surface, a sealed and outwardly bevelled base end, a sealed and outwardly threaded tip end for holding a cutting die head thereon with the tip end further having a threaded filling bore disposed therethrough and aligned with the central axis, a lip extended radially inwards from the interior surface between the base and tip end to define an air cavity for holding air therein located adjacent to the base end and a plunger cavity for holding oil therein located adjacent to the tip end, an inlet ball valve extended between the exterior surface and air cavity for allowing air into the air cavity, a pressure release valve extended between the base end and air cavity with a depressible button extended therefrom for allowing air to be released from the air cavity when depressed, and a threaded oil outlet extended between the exterior surface and the plunger cavity for allowing oil disposed within the plunger cavity to exit therethrough;

a plunger slidably disposed within the plunger cavity, the plunger having a generally cylindrical head with a front end and a rear end and a plurality of seal rings disposed therearound in contact with the interior surface of the handle, the rear end of the head positionable against the lip of the handle when the plunger cavity is completely filled with oil through the filling bore, the front end of the head positionable near the tip end of the handle when the plunger cavity is nearly devoid of oil;

an elongated and flexible oil hose for allowing oil to be released from the plunger cavity, the oil hose having a base end threadably coupled within the oil outlet and a cone-shaped nozzle adapted to be positioned near a cutting die head for applying oil thereto for cutting;

an oil hose holder formed of two spaced, aligned, and rigid clamps coupled to the exterior surface of the handle for holding the oil hose in a stowed configuration;

an elongated and rigid push-rod having a handle end and a tip end with the tip end positionable through the filling bore for pushing the plunger back towards the base end of the handle, thereby allowing the plunger cavity to be refilled with oil;

a push rod holder formed of two spaced, aligned, and rigid clamps coupled to the exterior surface of the handle opposite the oil hose holder for holding the push rod in a stowed configuration;

an oil plug threadably coupled within the filling bore of the handle;

an oil cap securable over the nozzle of the oil hose for preventing oil leakage therefrom with the cap further having a tether extended therefrom and secured to a bracket of the oil hose holder for securing the cap in a proximal location for use; and an air pump coupled to the handle directly below the inlet ball valve thereof, the air pump having a hollow housing with an open front end facing the tip end of the handle, a sealed rear end facing the base end of the handle, an air intake extended from the rear end, a trigger having a rear end slidably disposed within the front end of the housing and a front end extended therefrom, a rubber seal secured between the trigger and housing, a one-way check valve disposed within the air intake, and a spring disposed between the trigger and rear end of the housing, whereby when the trigger is depressed, the one-way check valve is closed and air within the housing is forced through the ball valve and into the air cavity for building pressure therein, thus forcing the plunger towards the tip end of the handle for allowing oil to be released through the oil hose, and when the trigger is released, the one-way check valve opens for allowing air into the housing.

2. A die handle oiling system for use with a cutting die head comprising:

a tubular handle having a sealed base end, a sealed and tip end adapted for holding a cutting die head thereon, an air cavity for holding air formed therein adjacent to the base end, and a plunger cavity formed therein for holding oil adjacent to the tip end and in communication with the air cavity, an inlet valve extended from the air cavity for allowing air to be disposed therein, a pressure release valve extended from the air cavity for allowing air to be released therefrom, a sealable filling bore extended from the plunger cavity for allowing oil to be disposed therein, and an oil outlet extended from the plunger for allowing oil to be released therefrom;

a plunger slidably disposed within the plunger cavity;

an oil hose coupled to the oil outlet; and an actuatable air pump coupled to the inlet valve for filling the air cavity with air, whereby when the air pump is actuated, air pressure builds in the air cavity and forces the plunger towards the tip end of the handle for allowing oil to be released through the oil hose.

3. The die handle oiling system for use with a cutting die head as set forth in claim 2 further comprising an oil hose holder coupled to the handle for holding the oil hose in a stowed configuration.

4. The die handle oiling system for use with a cutting die head as set forth in claim 2 further comprising an oil cap for sealing the oil hose.

5. The die handle oiling system for use with a cutting die head as set forth in claim 2 further comprising a push-rod for pushing the plunger back towards the base end, thereby allowing the plunger cavity to be refilled with oil.

6. The die handle oiling system for use with a cutting die head as set forth in claim 4 further comprising a push rod holder coupled to the handle for holding the push rod in a stowed configuration.

* * * * *